US007003324B2

(12) United States Patent
Hiramatsu

(10) Patent No.: US 7,003,324 B2
(45) Date of Patent: Feb. 21, 2006

(54) BASE STATION APPARATUS WITH RECEPTION AND DIVERSITY WEIGHT COMBINING

(75) Inventor: Katsuhiko Hiramatsu, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 375 days.

(21) Appl. No.: 10/182,137

(22) PCT Filed: Dec. 19, 2001

(86) PCT No.: PCT/JP01/11119

§ 371 (c)(1),
(2), (4) Date: Jul. 26, 2002

(87) PCT Pub. No.: WO02/51034

PCT Pub. Date: Jun. 27, 2002

(65) Prior Publication Data

US 2003/0114194 A1    Jun. 19, 2003

(30) Foreign Application Priority Data

Dec. 21, 2000 (JP) ............................. 2000-389528

(51) Int. Cl.
*H04B 1/38* (2006.01)
*H04M 1/00* (2006.01)

(52) U.S. Cl. .................. 455/562.1; 455/561; 342/361; 342/378; 375/347

(58) Field of Classification Search ............... 455/561, 455/562.1; 342/361, 378; 375/347

See application file for complete search history.

(56) References Cited

U.S. PATENT DOCUMENTS 5,691,727 A  * 11/1997 Cyzs ........................ 342/361

(Continued)

FOREIGN PATENT DOCUMENTS

EP    0687076    12/1995
EP    0926843    6/1999

(Continued)

OTHER PUBLICATIONS

Chinese Office Action with English translation dated Aug. 29, 2003.

(Continued)

*Primary Examiner*—William Trost
*Assistant Examiner*—Stephen D'Agosta
(74) *Attorney, Agent, or Firm*—Stevens, Davis, Miller & Mosher, LLP

(57) ABSTRACT

A base station apparatus may include a plurality of antenna element groups that each have a plurality of antenna elements arranged in a vertical direction. A reception weight combining section generates a combined signal for each antenna element group by multiplying a signal received by each antenna element of the group with a weight and combining the weighted signals of the antenna element group. A selection section measures reception power of the combined signal for each antenna element group and selects an antenna element group based on the measured reception powers. A transmission weight combining section multiplies a transmit signal with a weight applied by the reception weight combining section to a signal received by an antenna element of the selected antenna element group, and a diversity transmission section transmits the transmit signal from the selected antenna element group.

3 Claims, 6 Drawing Sheets

U.S. PATENT DOCUMENTS

| | | | |
|---|---|---|---|
| 5,999,826 A * | 12/1999 | Whinnett | 455/561 |
| 6,064,338 A * | 5/2000 | Kobayakawa et al. | 342/378 |
| 6,081,566 A * | 6/2000 | Molnar et al. | 375/347 |
| 6,154,661 A * | 11/2000 | Goldburg | 455/562.1 |
| 6,185,440 B1 * | 2/2001 | Barratt et al. | 455/562.1 |
| 6,314,305 B1 * | 11/2001 | Solondz et al. | 455/562.1 |
| 6,411,824 B1 * | 6/2002 | Eidson | 455/561 |

FOREIGN PATENT DOCUMENTS

| | | |
|---|---|---|
| GB | 2323750 | 9/1998 |
| JP | 10303809 | 11/1998 |
| JP | 11215040 | 8/1999 |
| JP | 2000183795 | 6/2000 |
| JP | 2000201012 | 7/2000 |
| WO | 9728615 | 8/1997 |
| WO | 9740588 | 10/1997 |

OTHER PUBLICATIONS

Supplementary Partial European Search Report dated May 10, 2004.

International Search Report dated Mar. 26, 2002.

3G TS 25.224 v3.3.0, $3^{rd}$ Generation Partnership Project: Technical Specification Group Radio Access Network; Physical Layer Procedures (TDD), 1999.

Supplementary European Search Report dated Jul. 7, 2004.

* cited by examiner

BASE STATION APPARATUS WITH RECEPTION AND DIVERSITY WEIGHT COMBINING

TECHNICAL FIELD

The present invention relates to a base station apparatus used in a digital mobile communication system, and more particularly to a base station apparatus provided with an adaptive array antenna.

BACKGROUND ART

A conventional base station is provided with an adaptive array antenna (hereinafter referred to as "AAA") in order to suppress the effects of interference waves (such as adjacent-channel interference waves, same-channel interference waves, and delayed waves) in a received signal. A base station provided with an AAA has a plurality of antennas, and can strongly receive only an electromagnetic wave arriving from a desired direction (hereinafter referred to as "forming reception directionality") by providing amplitude and phase adjustment for the signal received from each antenna (that is, each received signal sequence). Amplitude and phase adjustment for a received signal is carried out by multiplying each received signal sequence by a sequence-specific complex coefficient (reception weight).

A base station provided with such an AAA can strongly transmit an electromagnetic wave in a desired direction (hereinafter referred to as "having transmission directionality") by transmitting a transmit signal multiplied by a sequence-specific complex coefficient (transmission weight) via an antenna corresponding to a sequence.

There are two main methods, as described below, for arranging antennas in this kind of base station. Firstly, there is a method (hereinafter referred to as "method 1") whereby the antennas are arranged in positions such that the fading correlation between the signals received by the antennas is virtually 1.

When method 1 is used, a base station can obtain greater array gain both when receiving and when transmitting. For example, if the total number of deployed antennas is designated N, introducing an array antenna makes it possible to obtain a received signal that has a 2N-fold antenna gain. Also, introducing an array antenna makes it possible to obtain a received signal that has an N-fold S/N ratio.

Secondly, there is a method (hereinafter referred to as "method 2") whereby the antennas are arranged in positions such that the fading correlation between the signals received by the antennas is virtually 0.

When method 2 is used, since the fading correlation between the signals received by the antennas is virtually 0, a base station can perform diversity reception using the signals received from the respective antennas. As a result, a base station can obtain a better received signal, with decreased fading effects, than when method 1 is used.

However, the following problems apply to a base station provided with a conventional AAA such as described above. When method 1 is used, since the fading correlation between the signals received by the antennas is virtually 1, the base station cannot perform diversity reception using the signals received from the respective antennas. Consequently, it is difficult for a base station to obtain a better received signal with decreased fading effects.

In order to prevent this kind of problem, a base station need only be provided with the number of AAAs necessary for diversity. However, in this case, the number of antennas to be installed increases, and antenna installation becomes difficult. In addition, as the number of antennas increases, the number of complex coefficients (reception weights and transmission weights) to be calculated also increases, and the scale of computation necessary for weight calculations becomes extremely large.

Furthermore, when method 2 is used, in directionality for a transmit signal, side lobes are generated in all directions rather than only in the desired direction. As a result, a mobile station located in a direction other than the above-mentioned desired direction receives major interference, and consequently has difficulty in achieving good communication. Thus, use of method 2 is not suitable for a multi-user environment such as CDMA.

DISCLOSURE OF INVENTION

It is an object of the present invention to provide a base station apparatus that suppresses the effects of fading and interference and obtains a received signal with good characteristics while maintaining good communication quality in a mobile station apparatus (communication terminal apparatus).

This object can be achieved by providing antenna elements for a plurality of branches arranged so as to have a mutually vertical positional relationship at a sequence-specific predetermined position in the horizontal plane on a sequence-by-sequence basis, performing adaptive array antenna processing using a received signal for each sequence on a branch-by-branch basis, generating a combined signal that combines signals resulting from multiplying a received signal for each above-mentioned sequence by a sequence-specific weight, and performing diversity combining using the generated combined signals of each branch.

Moreover, this object can be achieved by providing vertical-polarization antenna elements corresponding to a first branch and horizontal-polarization antenna elements corresponding to a second branch, arranged at mutually predetermined distances at sequence-specific predetermined positions in the horizontal plane, performing adaptive array antenna processing using a received signal for each sequence on a branch-by-branch basis, generating a combined signal that combines signals resulting from multiplying a received signal for each above-mentioned sequence by a sequence-specific weight, and performing diversity combining using the generated combined signals of each branch.

BEST MODE FOR CARRYING OUT THE INVENTION

Figure 1:
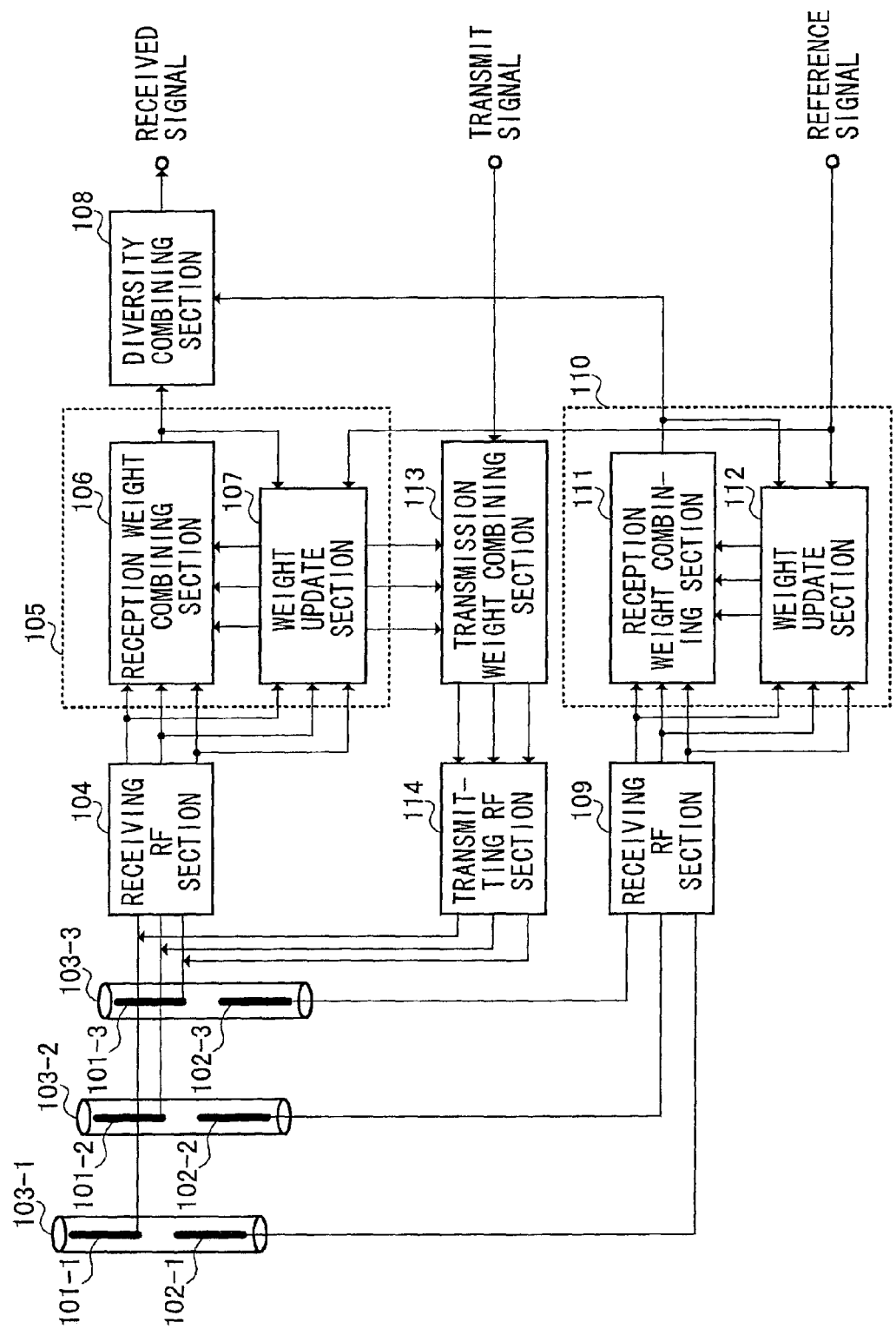
FIG. 1 is a block diagram showing the configuration of a base station apparatus according to Embodiment 1 of the present invention.

With reference now to the accompanying drawings, embodiments of the present invention will be explained in detail below.

(Embodiment 1)

A base station provided with an AAA obtains a received signal that has high gain, and also forms reception directionality (that is, converges the beam width in the horizontal plane), by combining signals received from a plurality of antennas. A base station provided with such an AAA can increase received signal gain through the introduction of the AAA. That is to say, even if the gain of the signal received by each of the antennas forming the AAA is small, this base station can obtain a high-gain signal by combining the signals received by the antennas. With this base station, therefore, it is possible to reduce the gain of the signal received by each of the antennas forming the AAA, and thus it is possible to shorten the length of each antenna.

Thus, in this embodiment, first, a predetermined antenna sequence (here designated "antenna sequence 1") is formed by providing antenna elements of shortened length corresponding to the number of branches (in this embodiment, "branch 1" and "branch 2"), and arranging the antenna elements corresponding to branch 1 (an antenna element group composed of a plurality of antenna elements) and branch 2 so as to have a mutually vertical positional relationship at a predetermined point on the horizontal plane (here designated "point 1"). Here, it is desirable for each antenna element to be placed at the above-mentioned predetermined point so that the central axes of the antenna elements corresponding to the respective branches virtually coincide.

Next, a predetermined antenna sequence (here designated "antenna sequence 2") formed by means of a similar method is arranged at a point other than above-mentioned point 1 (here designated "point 2"). Here, the antenna element corresponding to branch 1 (branch 2) in antenna sequence 2 is placed at virtually the same height as that at which the antenna element corresponding to branch 1 (branch 2) in antenna sequence 1 is placed. Thereafter, the desired number of predetermined antenna sequences formed by means of a similar method are arranged. By this means, an antenna with a plurality of branches can easily be installed.

With regard to the length of each antenna element, it is possible for this to be set in accordance with the number of sequences, for example. For example, as the number of sequences increases, the gain of a signal in which the signals received by the antenna sequences are combined also increases, and it is therefore possible to shorten the length of the antenna elements of each sequence.

An actual example will be described with reference to FIG. 1. FIG. 1 is a block diagram showing the configuration of a base station apparatus according to Embodiment 1 of the present invention. In this embodiment, a case will be described, as an example, in which the number of branches is 2 and the number of sequences is 3.

First, antenna elements of shortened length (for example, antenna elements of virtually cylindrical shape-though antenna elements of other than virtually cylindrical shape are possible) 101-1 and 102-1 are provided. Antenna element 101-1 (that is, the antenna element corresponding to branch 1) and antenna element 102-1 (that is, the antenna element corresponding to branch 2) are arranged so as to have a mutually vertical positional relationship at point 1 in the horizontal plane. Here, antenna element 101-1 and antenna element 102-1 are arranged so that their central axes virtually coincide. By this means, antenna sequence 1 is formed. Furthermore, in this embodiment, antenna sequence 1 is covered by a radome (for example, a radome of virtually cylindrical shape) 103-1. This radome 103-1 is used to prevent antenna element 101-1 and antenna element 102-1 from being affected by wind.

Next, antenna element 101-2 and antenna element 102-2, having a similar configuration to antenna element 101-1 and antenna element 102-1, are provided. Antenna element 101-2 (that is, the antenna element corresponding to branch 1) and antenna element 102-2 (that is, the antenna element corresponding to branch 2) are arranged so as to have a mutually vertical positional relationship at point 2 in the horizontal plane. Here, antenna element 101-2 (antenna element 102-2) is placed at virtually the same height as that at which antenna element 101-1 (antenna element 102-1) is placed. By this means, antenna sequence 2 is formed. Antenna sequence 1 is covered by a radome (here, radome 103-2) in the same way as antenna sequence 1.

Similarly, antenna sequence 3 is formed, by means of the same method as described above, using antenna element 101-3 (that is, an antenna element corresponding to branch 1) and antenna element 102-3 (that is, an antenna element corresponding to branch 2). It goes without saying that antenna element 101-3 (antenna element 102-3) is placed at virtually the same height as that at which antenna element 101-1 and antenna element 101-2 (antenna element 102-1 and antenna element 102-2) are placed.

The overall configuration of a base station apparatus according to this embodiment will now be described, again with reference to FIG. 1. In branch 1, the signal received by antenna element 101-1 in antenna sequence 1 (sequence 1 received signal), the signal received by antenna element 101-2 in antenna sequence 2 (sequence 2 received signal), and the signal received by antenna element 101-3 in antenna sequence 3 (sequence 3 received signal), are output to a receiving RF section 104.

The receiving RF section 104 performs predetermined reception processing, such as frequency conversion, on the sequence 1 received signal through sequence 3 received signal. Following this reception processing, the sequence 1 through sequence 3 received signals are output to a received signal processing section 105.

In the received signal processing section 105, a reception weight combining section 106 generates a combined signal by multiplying the sequence 1 through sequence 3 received signals that have undergone reception processing by sequence-specific reception weights from a weight update section 107. The generated combined signal is output to the weight update section 107 and a diversity combining section 108. Using a reference signal, the sequence 1 through sequence 3 received signals that have undergone reception processing from the receiving RF section 104, and the combined signal from the reception weight combining section 106, the weight update section 107 generates reception weights specific to sequence 1 through sequence 3, respectively. The generated reception weights are output to the reception weight combining section 106 and a transmission weight combining section 113.

The transmission weight combining section 113 uses the reception weights specific to sequence 1 through sequence 3, respectively, from the weight update section 107 as transmission weights specific to sequence 1 through sequence 3, respectively. That is to say, the transmission weight combining section 113 generates sequence 1 through sequence 3 transmit signals by multiplying a transmit signal by transmission weights specific to sequence 1 through sequence 3, respectively, and outputs these transmit signals to a transmitting RF section 114.

The transmitting RF section 114 performs predetermined transmission processing, such as frequency conversion, on the sequence 1 through sequence 3 transmit signals, and transmits the sequence 1 through sequence 3 transmit signals that have undergone transmission processing via sequence 1 antenna element 101-1 through sequence 3 antenna element 101-3, respectively.

Meanwhile, in branch 2, the signal received by antenna element 102-1 in antenna sequence 1 (sequence 1 received signal), the signal received by antenna element 102-2 in antenna sequence 2 (sequence 2 received signal), and the signal received by antenna element 102-3 in antenna sequence 3 (sequence 3 received signal), are output to a receiving RF section 109.

Receiving RF section 109 performs predetermined reception processing, such as frequency conversion, on the sequence 1 received signal through sequence 3 received signal. Following this reception processing, the sequence 1 through sequence 3 received signals are output to a received signal processing section 110.

In received signal processing section 110, a reception weight combining section 111 generates a combined signal by multiplying the sequence 1 through sequence 3 received signals that have undergone reception processing by sequence-specific reception weights from a weight update section 112. The generated combined signal is output to weight update section 112 and the diversity combining section 108. Using a reference signal, the sequence 1 through sequence 3 received signals that have undergone reception processing from receiving RF section 109, and the combined signal from reception weight combining section 111, weight update section 112 generates reception weights specific to sequence 1 through sequence 3, respectively. The generated reception weights are output to reception weight combining section 111.

The diversity combining section 108 generates a new received signal by performing diversity combining using the combined signal generated by reception weight combining section 106 and the combined signal generated by reception weight combining section 111.

The operation of a base station apparatus that has the above configuration will now be described, again with reference to FIG. 1. In order to simplify the description, it is here assumed that the aforementioned base station apparatus performs communication with mobile station apparatus 1. Mobile station apparatus 1 transmits an information signal (containing a known signal) and a reference signal at different times.

A signal transmitted by mobile station apparatus 1 is received by a base station apparatus according to this embodiment via sequence 1 through sequence 3 antennas. First, in branch 1, signals received by sequence 1 antenna element 101-1 through sequence 3 antenna element 101-3-that is, sequence 1 through sequence 3 received signals-are subjected to predetermined reception processing, such as frequency conversion, by receiving RF section 104, and are then output to received signal processing section 105. In received signal processing section 105, the kind of adaptive array antenna processing (hereinafter referred to as "AAA processing") described below is performed.

At the reception time for a reference signal (that is, when the sequence 1 through sequence 3 received signals are signals corresponding to a reference signal), in reception weight combining section 106, sequence 1 through sequence 3 received signals that have undergone reception processing are each multiplied by the respective sequence-specific reception weight from weight update section 107, and the sequence 1 through sequence 3 received signals multiplied by the sequence-specific reception weights are combined. By this means, a combined signal is generated. The generated combined signal is output to weight update section 107. In weight update section 107, the reception weights specific to sequence 1 through sequence 3, respectively, are updated so that the difference between the combined signal and a previously stored reference signal is made smaller. The updated reception weights are output to reception weight combining section 106 and the transmission weight combining section 113.

At the reception time for an information signal (containing a known signal) (that is, when the sequence 1 through sequence 3 received signals are signals corresponding to an information signal), in reception weight combining section 106, sequence 1 through sequence 3 received signals multiplied by sequence-specific reception weights are combined. By this means, a branch 1 combined signal is generated. This branch 1 combined signal is a signal that has a large array gain. As a result, interference waves (such as adjacent-channel interference waves, same-channel interference waves, and delayed waves, for example) are suppressed in this branch 1 combined signal. The generated branch 1 combined signal is output to the diversity combining section 108.

Next, in branch 2, signals received by sequence 1 antenna element 102-1 through sequence 3 antenna element 102-3—that is, sequence 1 through sequence 3 received signals—are output to received signal processing section 109. In received signal processing section 109, reception weight combining section 111, and weight update section 112, the same kind of processing is performed as in receiving RF section 104, reception weight combining section 106, and weight update section 107, respectively, for branch 1. As a result, sequence 1 through sequence 3 received signals multiplied by sequence-specific reception weights are combined in reception weight combining section 111. By this means, a branch 2 combined signal is generated. This branch 2 combined signal is a signal that has a large array gain. As a result, interference waves (such as adjacent-channel interference waves, same-channel interference waves, and delayed waves, for example) are suppressed in this branch 2 combined signal. The generated branch 2 combined signal is output to the diversity-combining section 108.

In the diversity combining section 108, diversity combining is performed using the branch 1 combined signal from reception weight combining section 106 and the branch 2 combined signal from reception weight combining section 111.

That is to say, channel estimation—that is, fading fluctuation estimation—for branch 1 (branch 2) is first carried out using the signal corresponding to a known signal in the branch 1 (branch 2) combined signal. By this means, a branch 1 channel estimate ($\alpha 1$) and branch 2 channel estimate ($\alpha 2$) are generated. Then diversity combining is performed using the signal corresponding to an information signal in the branch 1 combined signal (r1(t)), the signal corresponding to an information signal in the branch 2 combined signal (r2(t)), the branch 1 channel estimate, and the branch 2 channel estimate. By this means, a new received signal is generated.

Specifically, when maximal-ratio combining is used for diversity combining, for example, the new received signal (r(t)) is expressed by the equation shown below. Below, α1* indicates the complex conjugate of α1, and α2* indicates the complex conjugate of α2.

$$r(t)=\alpha1^*(t)r1(t)+\alpha2^*(t)r2(t) \quad (1)$$

When equal-gain combining is used for diversity combining, the new received signal is expressed by the equation shown below.

$$r(t)=\alpha1^*(t)r1(t)/|\alpha1|+\alpha2^*(t)r2(t)/|\alpha2| \quad (2)$$

When selective combining is used for diversity combining, the new received signal is expressed by the equations shown below.

$$r(t)=\alpha1^*(t)r1(t)/|\alpha1| \text{ (where } |\alpha1|>|\alpha2|) \quad (3)$$

$$r(t)=\alpha2^*(t)r2(t)/|\alpha2| \text{ (where } |\alpha1|<|\alpha2|) \quad (4)$$

It is possible to use any one of maximal-ratio combining, equal-gain combining, or selective combining for diversity combining. The received signal with the best characteristics can be obtained by using maximal-ratio combining.

In the obtained new received signal, the effects of fading fluctuation are lessened due to the fact that diversity combining has been performed.

Meanwhile, a transmit signal is output to the transmission weight combining section 113. In the transmission weight combining section 113, sequence 1 through sequence 3 transmit signals are generated by multiplying the transmit signal by transmission weights specific to sequence 1 through sequence 3, respectively. Transmission weights specific to sequence 1 through sequence 3, respectively, are equivalent to the reception weights specific to sequence 1 through sequence 3, respectively, updated by weight update section 107. The generated sequence 1 through sequence 3 transmit signals are output to the transmitting RF section 114.

After undergoing predetermined transmission processing by the transmitting RF section 114, the sequence 1 through sequence 3 transmit signals are transmitted to receiving station apparatus 1 via sequence 1 antenna element 101-1 through sequence 3 antenna element 101-3 in branch 1, respectively.

In the directionalities of signals transmitted via sequence 1 antenna element 101-1 through sequence 3 antenna element 101-3, a beam is present in the direction of arrival of mobile station apparatus 1 due to the fact that multiplication by transmission weights has been performed by the transmission weight combining section 113. As a result, reception power can be increased in mobile station apparatus 1, and interference imposed on mobile station apparatuses other than mobile station apparatus 1 can be suppressed. Therefore, communication quality can be maintained at a good level in mobile station apparatus 1 and other mobile station apparatuses.

In this embodiment, a case has been described in which transmit signals are transmitted from branch 1, but it is also possible to for transmit signals to be transmitted from branch 2. However, the branch 1 antenna (that is, antenna element 101-1 through antenna element 101-3) is arranged at a higher position than the branch 2 antenna (that is, antenna element 102-1 through antenna element 102-3). Thus, transmission of transmit signals from branch 1 is advantageous in terms of propagation loss and securement of line-of-sight. It is therefore preferable for transmit signals to be transmitted from branch 1 rather than branch 2.

As described above, in this embodiment, a plurality of antenna elements are arranged so as to have a mutually vertical positional relationship at a predetermined point in the horizontal plane on a sequence-by-sequence basis. By this means, a plurality of antenna element branches can easily be installed. Also, a signal in which interference waves are suppressed can be obtained by multiplying the received signal of each sequence by a sequence-specific reception weight, on a branch-by-branch basis, and combining the received signals of the respective sequences that have been multiplied by a reception weight (performing AAA processing). By this means, it is possible to extract only the signal transmitted by the desired mobile station apparatus from a received signal. Moreover, by performing diversity combining of combined signals obtained by AAA processing on a branch-by-branch basis, it is possible to obtain a signal in which the effects of fading fluctuation are lessened.

(Embodiment 2)

Figure 2:
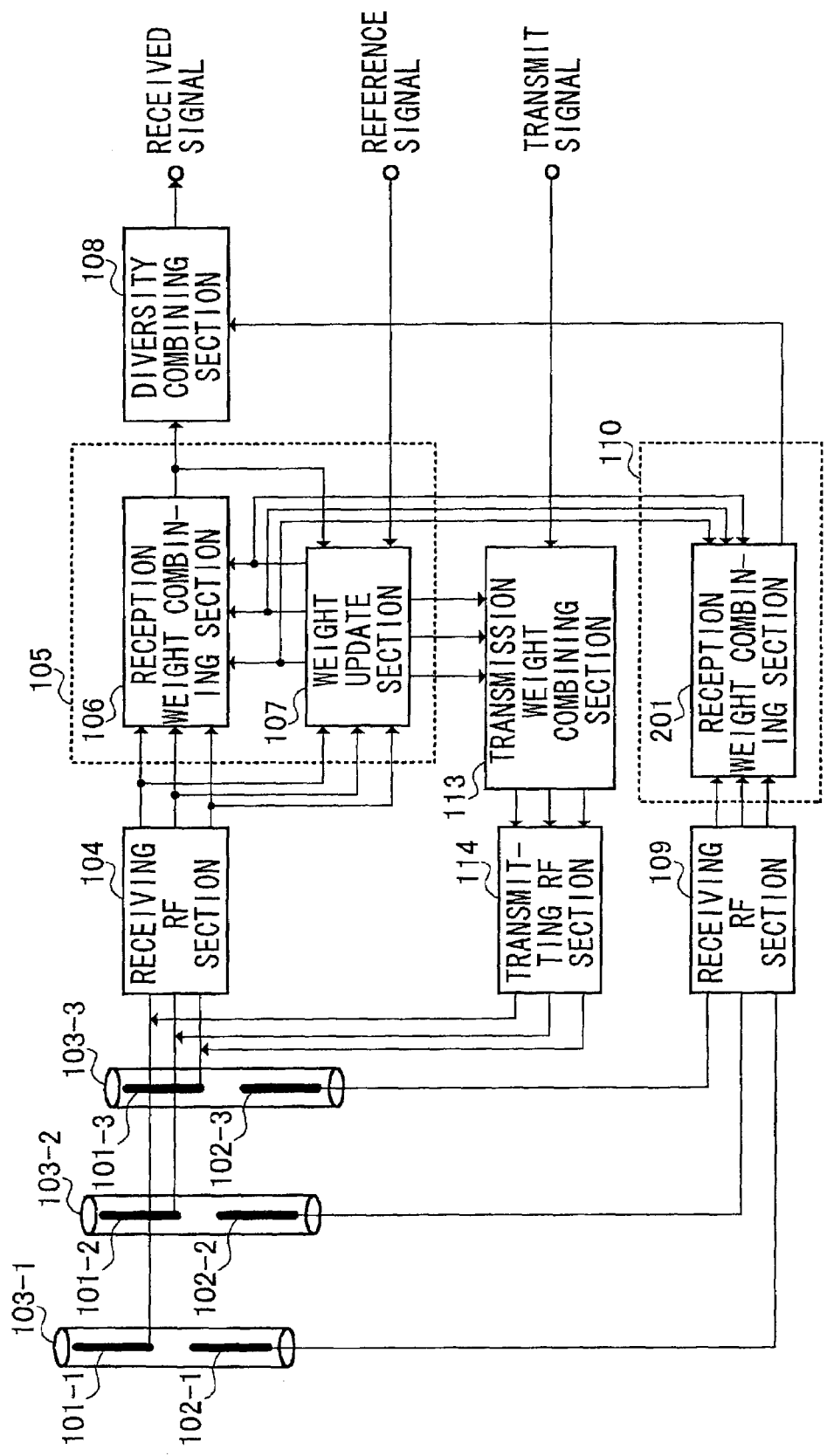
FIG. 2 is a block diagram showing the configuration of a base station apparatus according to Embodiment 2 of the present invention.

In this embodiment, a case is described, with reference to FIG. 2, in which the amount of reception weight computation in AAA processing in Embodiment 1 is reduced. FIG. 2 is a block diagram showing the configuration of a base station apparatus according to Embodiment 2 of the present invention. Parts in FIG. 2 identical to those in Embodiment 1 (FIG. 1) are assigned the same codes as in FIG. 1 and their detailed explanations are omitted.

In FIG. 2, a base station apparatus according to this embodiment has a configuration wherein weight update section 112 is eliminated from a base station apparatus according to Embodiment 1, and a reception weight combining section 201 is provided instead of reception weight combining section 111.

To consider a predetermined sequence (here, for example, sequence 1), a signal received by branch 1 antenna element 101-1 and a signal received by branch 2 antenna element 102-1 virtually coincide as regards direction of arrival, and differ only in signal strength. The same also applies to sequence 2 and sequence 3.

Thus, in this embodiment, reception weight calculation is performed for only one of a plurality of branches, and the calculated reception weights are used as reception weights for all the above-mentioned plurality of branches. Following this, diversity combining that takes account of the effects of fading fluctuation is performed using the combined signal obtained by AAA processing in the above-mentioned plurality of branches. Thus, reception weight calculation is performed for only one branch rather than for all branches, enabling the amount of computation required for reception weight calculation to be reduced.

At the reception time for an information signal (containing a known signal) (that is, when the sequence 1 through sequence 3 received signals are signals corresponding to an information signal), in reception weight combining section 201, sequence 1 through sequence 3 received signals that have undergone reception processing are multiplied by sequence-specific reception weights from weight update section 107, respectively, and the sequence 1 through sequence 3 received signals multiplied by the sequence-specific reception weights are combined. By this means, a branch 2 combined signal is generated.

As described above, in this embodiment, reception weight calculation is performed for only one of a plurality of branches, and the calculated reception weights are used as reception weights for all the above-mentioned plurality of branches. By this means, it is possible to reduce the amount of computation required for reception weight calculation compared with Embodiment 1.

(Embodiment 3)

Figure 3:
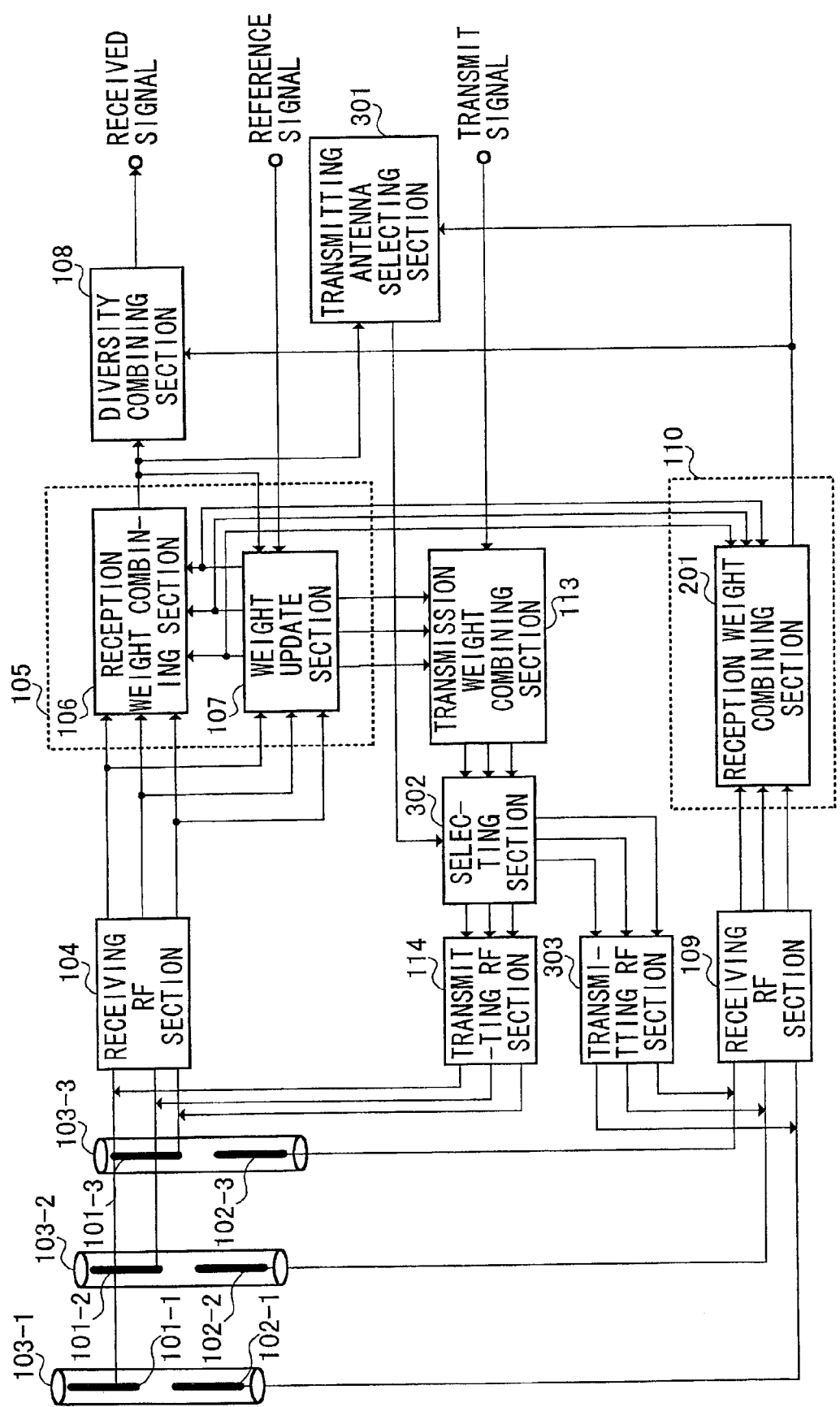
FIG. 3 is a block diagram showing the configuration of a base station apparatus according to Embodiment 3 of the present invention.

In this embodiment, a case is described, with reference to FIG. 3, in which diversity transmission is performed in Embodiment 2. FIG. 3 is a block diagram showing the configuration of a base station apparatus according to Embodiment 3 of the present invention. Parts in FIG. 3 identical to those in Embodiment 2 (FIG. 2) are assigned the same codes as in FIG. 2 and their detailed explanations are omitted.

In FIG. 3, a base station apparatus according to this embodiment has a configuration wherein a transmitting antenna selecting section 301, selecting section 302, and transmitting RF section 303 are provided in a base station apparatus according to Embodiment 1.

As described in Embodiment 2 above, to consider a predetermined sequence (here, for example, sequence 1), a signal received by branch 1 antenna element 101-1 and a signal received by branch 2 antenna element 102-1 virtually coincide as regards direction of arrival, and differ only in signal strength.

Thus, in this embodiment, reception weight calculation is performed for only one of a plurality of branches, and the calculated reception weights are used as reception weights and transmission weights for all the above-mentioned plurality of branches. Following this, diversity combining that takes account of the effects of fading fluctuation is performed using the combined signal obtained by AAA processing in the above-mentioned plurality of branches. Thus, transmission weight calculation is performed for only one branch rather than for all branches, enabling the amount of computation required for transmission weight calculation to be reduced.

The transmitting antenna selecting section 301 measures the reception power of a branch 1 combined signal generated by a reception weight combining section 106 and the reception power of a branch 2 combined signal generated by a reception weight combining section 201, and selects the branch corresponding to the combined signal with the greater reception power as the branch to transmit a transmit signal. This transmitting antenna selecting section 301 outputs the selection result to the selecting section 302.

The selecting section 302 outputs sequence 1 through sequence 3 transmit signals from a transmission weight combining section 113 to a transmitting RF section 114 or transmitting RF section 303 in accordance with the selection result of the transmitting antenna selecting section 301. That is to say, when branch 1 (branch 2) is selected by the transmitting antenna selecting section 301, the selecting section 302 outputs sequence 1 through sequence 3 transmit signals to transmitting RF section 114 (transmitting RF section 303).

The transmitting RF section 303 has an identical configuration to above-described transmitting RF section 114, and performs predetermined transmission processing, such as frequency conversion, on sequence 1 through sequence 3 transmit signals, and then transmits sequence 1 through sequence 3 transmit signals that have undergone transmission processing via sequence 1 antenna element 102-1 through sequence 3 antenna element 102-3, respectively.

In the directionalities of signals transmitted via sequence 1 antenna element 101-1 through sequence 3 antenna element 101-3 (when branch 1 is selected) or sequence 1 antenna element 102-1 through sequence 3 antenna element 102-3 (when branch 2 is selected), a beam is present in the direction of arrival of mobile station apparatus 1 due to the fact that multiplication by transmission weights has been performed by the transmission weight combining section 113. As a result, reception power can be increased in mobile station apparatus 1, and interference imposed on mobile station apparatuses other than mobile station apparatus 1 can be suppressed. Therefore, communication quality can be maintained at a good level in mobile station apparatus 1 and other mobile station apparatuses.

Furthermore, by performing transmission to mobile station apparatus 1 via a branch selected based on the reception power of the combined signal of each branch (that is, diversity transmission), it is possible to compensate for a drop in reception power due to fading fluctuation in mobile station apparatus 1.

As described above, in this embodiment, reception weight calculation is performed for only one of a plurality of branches, and the calculated reception weights are used as reception weights and transmission weights for all the above-mentioned plurality of branches. By this means, it is possible to reduce the amount of computation required for transmission weight calculation, and also perform diversity transmission.

(Embodiment 4)

In this embodiment, a case is described in which polarization diversity is used in Embodiment 1.

In mobile communications, a mobile station apparatus user uses that mobile station apparatus for communication inclined at an angle of 45 degrees to the horizontal. Consequently, a vertically polarized wave and a horizontally polarized wave arrive at a base station apparatus. As the fading correlation between a vertically polarized wave and horizontally polarized wave is very low, the application of polarization diversity using a vertically polarized wave and horizontally polarized wave enables a signal with greater gain to be obtained than in the case of space diversity, in which a plurality of antennas are used in a spatially separated arrangement.

Thus, in this embodiment, polarization diversity is applied. However, if a single antenna is formed by leaving a predetermined distance between an antenna element that transmits and receives a vertically polarized wave (hereinafter referred to as "vertical polarization antenna element") and an antenna element that transmits and receives a horizontally polarized wave (hereinafter referred to as "horizontal polarization antenna element"), the thickness of the formed antenna will exceed 0.5 received signal wavelength. As a result, side lobes are generated in the directionality of a signal transmitted by this formed antenna. Consequently, a vertical polarization antenna element and horizontal polarization antenna element cannot be applied to an AAA.

In this embodiment, therefore, in order to reduce the thickness of the formed antenna, an antenna element that has a large beam width (preferably on the order of 120 degrees) in directionality is used as a vertical polarization antenna element and a horizontal polarization antenna element. Using an antenna element with such a beam width renders a large reflector plate unnecessary, enabling the thickness of the formed antenna to be reduced. Even if an antenna element with a large beam width in directionality is used here, a base station equipped with an AAA formed by using a plurality of such antenna elements can narrow the beam width in directionality.

Figure 4:
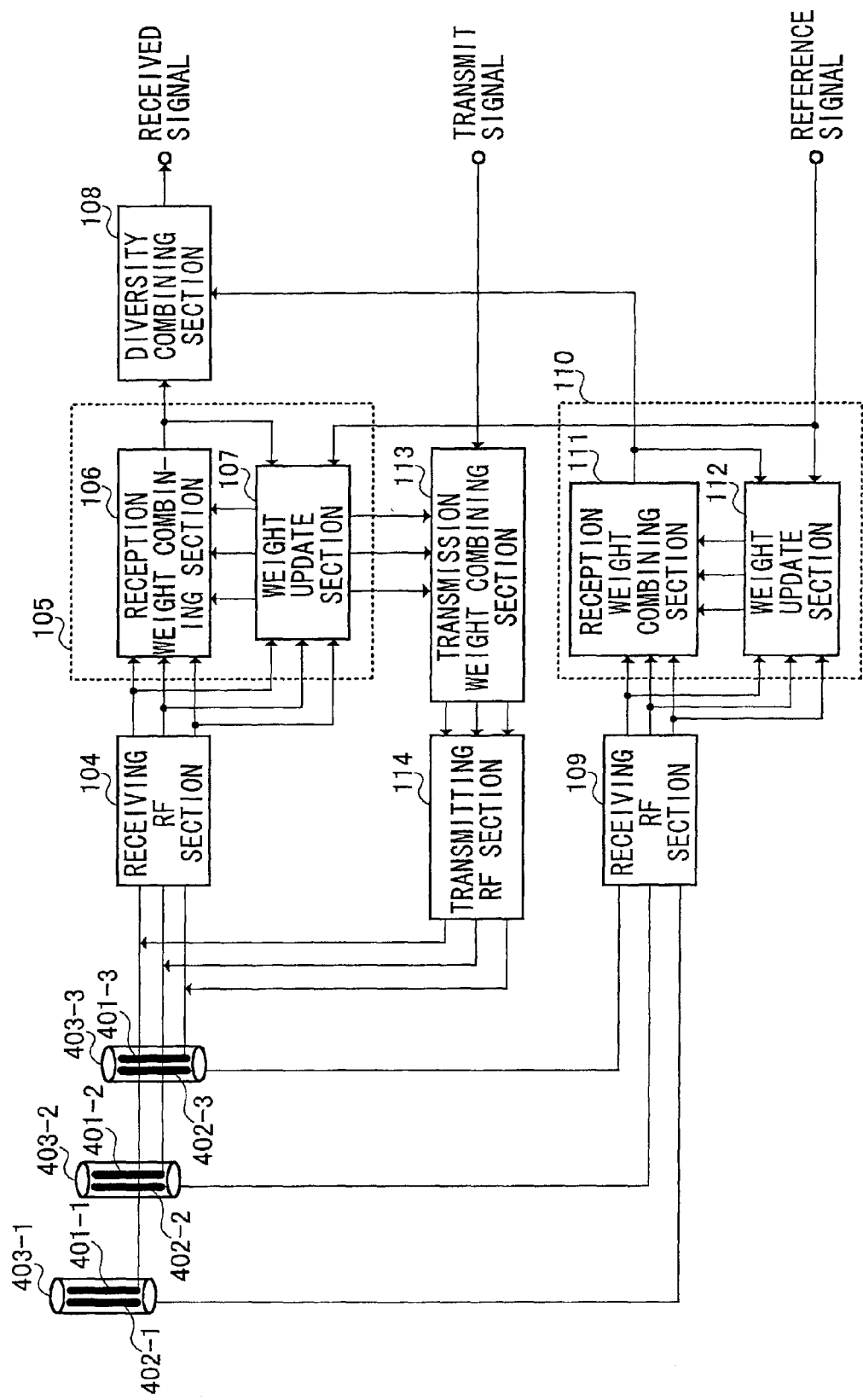
FIG. 4 is a block diagram showing the configuration of a base station apparatus according to Embodiment 4 of the present invention.

An actual example will now be described with reference to FIG. 4. FIG. 4 is a block diagram showing the configuration of a base station apparatus according to Embodiment 4 of the present invention. Parts in FIG. 4 identical to those in Embodiment 1 (FIG. 1) are assigned the same codes as in FIG. 1 and their detailed explanations are omitted. In this embodiment, a case will be described, as an example, in which the number of branches is 2 and the number of sequences is 3.

First, a vertical polarization antenna element 401-1 and horizontal polarization antenna element 402-1 (for example, antenna elements of virtually cylindrical shape) are provided. Each antenna element has a large beam width (preferably on the order of 120 degrees) in directionality.

A predetermined antenna sequence (here designated "antenna sequence 1") is formed by arranging vertical polarization antenna element 401-1 and horizontal polarization antenna element 402-1 with a predetermined distance left between them at a predetermined point on the horizontal plane (here designated "point 1"). In FIG. 4, an example is shown in which vertical polarization antenna element 401-1 and horizontal polarization antenna element 402-1 are arranged virtually in parallel, but there are no restrictions on the positional relationship between antennas.

Furthermore, in this embodiment, antenna sequence 1 is covered by a radome 403-1. This radome 403-1 has the same kind of configuration as radome 103-1 in Embodiment 1. In order to prevent the generation of side lobes in the directionality of a signal transmitted by this antenna sequence 1, the diameter of radome 403-1 is determined based on the directionality of vertical polarization antenna element 401-1 and horizontal polarization antenna element 402-1 so that the diameter of radome 403-1 is 0.5 received signal wavelength.

Next, a vertical polarization antenna element 401-2 (horizontal polarization antenna element 402-2) that has the same kind of configuration as vertical polarization antenna element 401-1 (horizontal polarization antenna element 402-1) is provided. A predetermined antenna sequence (here designated "antenna sequence 2") is formed by arranging vertical polarization antenna element 401-2 and horizontal polarization antenna element 402-2 with a predetermined distance left between them at a predetermined point other than point 1 on the horizontal plane (here designated "point 2"). In FIG. 4, an example is shown in which vertical polarization antenna element 401-1 and horizontal polarization antenna element 402-1 are arranged virtually in parallel, but there are no restrictions on the positional relationship between antennas. By this means, antenna sequence 2 is formed. This antenna sequence 2 is covered by a radome (here, radome 403-2), in the same way as antenna sequence 1.

Similarly, antenna sequence 3 is formed, by means of the same method as described above, using vertical polarization antenna element 401-3 and horizontal polarization antenna element 402-3.

The overall configuration of a base station apparatus according to this embodiment will now be described, again with reference to FIG. 4. In branch 1, the signal received by vertical polarization antenna element 401-1 in antenna sequence 1 (sequence 1 received signal), the signal received by vertical polarization antenna element 401-2 in antenna sequence 2 (sequence 2 received signal), and the signal received by vertical polarization antenna element 401-3 in antenna sequence 3 (sequence 3 received signal), are output to a receiving RF section 104. The same kind of processing is then performed by receiving RF section 104, reception weight combining section 106, and weight update section 107 as described in Embodiment 1. As a result, a branch 1 combined signal is generated by reception weight combining section 106. Interference waves (such as adjacent-channel interference waves, same-channel interference waves, and delayed waves, for example) are suppressed in this branch 1 combined signal. The generated branch 1 combined signal is output to a diversity combining section 108.

Next, in branch 2, the signal received by horizontal polarization antenna element 402-1 in antenna sequence 1 (sequence 1 received signal), the signal received by horizontal polarization antenna element 402-2 in antenna sequence 2 (sequence 2 received signal), and the signal received by horizontal polarization antenna element 402-3 in antenna sequence 3 (sequence 3 received signal), are output to a receiving RF section 109. The same kind of processing is then performed by receiving RF section 109, reception weight combining section 111, and weight update section 112 as described in Embodiment 1. As a result, a branch 2 combined signal is generated by reception weight combining section 111. Interference waves (such as adjacent-channel interference waves, same-channel interference waves, and delayed waves, for example) are suppressed in this branch 2 combined signal. The generated branch 2 combined signal is output to the diversity combining section 108.

In the diversity combining section 108, the same kind of processing is performed as described in Embodiment 1. By this means, a new received signal is generated. In the obtained new received signal, the effects of fading fluctuation are lessened due to the fact that diversity combining has been performed.

Meanwhile, sequence 1 through sequence 3 transmit signals generated by the transmission weight combining section 113 are subjected to transmission processing by receiving RF section 104, and are then transmitted to receiving station apparatus 1 via vertical polarization antenna element 401-1 through vertical polarization antenna element 401-3, respectively.

Antenna elements with a large beam width in directionality are used as vertical polarization antenna elements 401-1 through 401-3 and horizontal polarization antenna elements 402-1 through 402-3, but a base station apparatus that has such a plurality of vertical polarization antenna elements and horizontal polarization antenna elements can narrow the beam width in directionality.

As described above, in this embodiment, a vertical polarization antenna element and horizontal polarization antenna element that have a large beam width in directionality are arranged at a predetermined distance on a sequence-by-sequence basis. By this means, the thickness of antennas formed on a sequence-by-sequence basis can be reduced, and thus the generation of side lobes in the directionality of signals transmitted by these antennas can be prevented, and the arrangement of these antennas can be performed easily. Also, a signal in which interference waves are suppressed can be obtained by multiplying the received signal of each sequence by a sequence-specific reception weight, on a branch-by-branch basis, and combining the received signals of the respective sequences that have been multiplied by a reception weight (performing AAA processing). By this means, it is possible to extract only the signal transmitted by the desired mobile station apparatus from a received signal. Moreover, by performing diversity combining of combined signals obtained by AAA processing on a branch-by-branch basis, it is possible to obtain a signal in which the effects of fading fluctuation are lessened.

(Embodiment 5)

Figure 5:
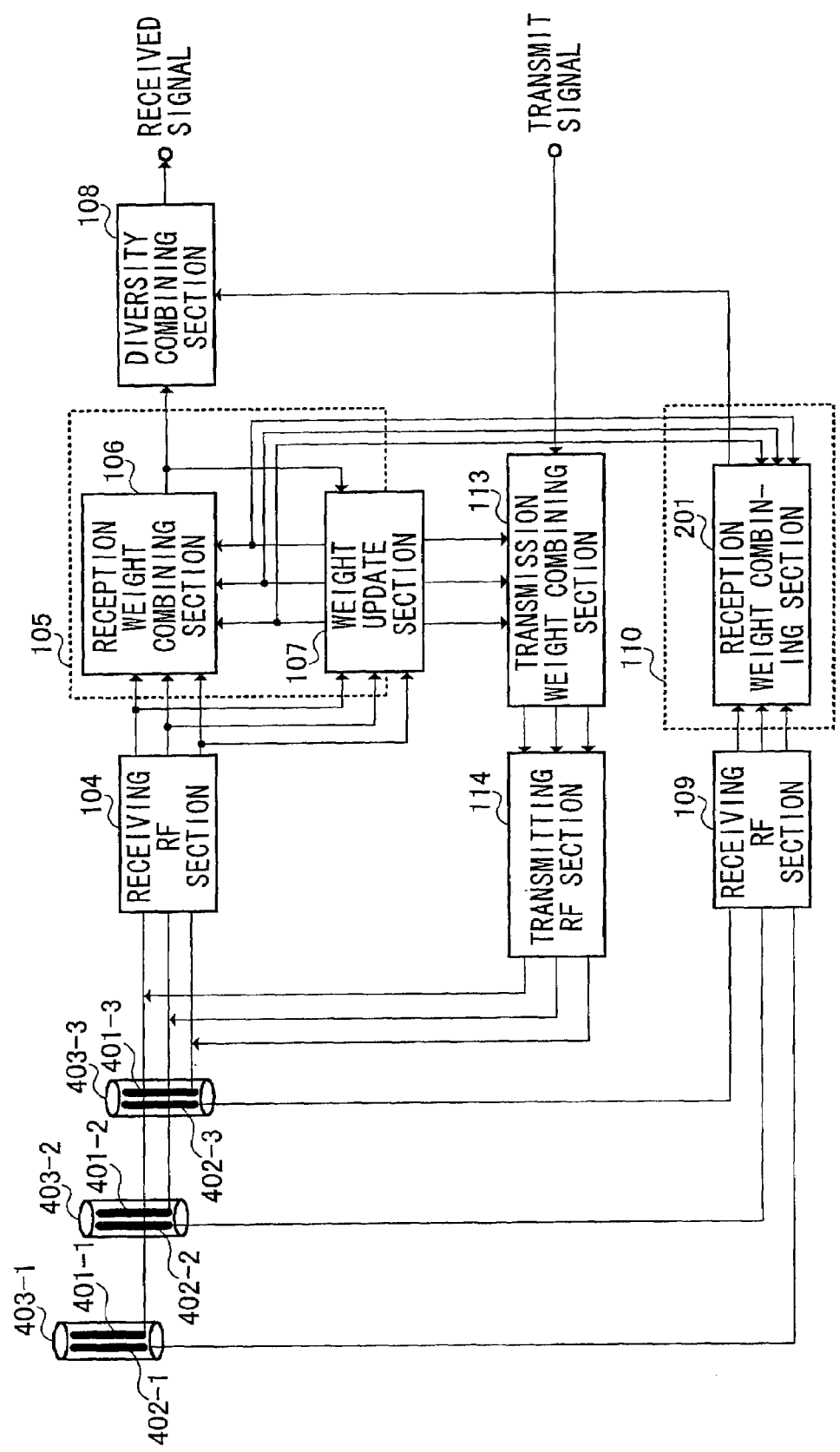
FIG. 5 is a block diagram showing the configuration of a base station apparatus according to Embodiment 5 of the present invention.

In this embodiment, a case is described, with reference to FIG. 5, in which the amount of reception weight computation in AAA processing in Embodiment 4 is reduced. FIG. 5 is a block diagram showing the configuration of a base station apparatus according to Embodiment 5 of the present invention. Parts in FIG. 5 identical to those in Embodiment 4 (FIG. 4) are assigned the same codes as in FIG. 4 and their detailed explanations are omitted.

In FIG. 5, a base station apparatus according to this embodiment has a configuration wherein weight update section 112 is eliminated from a base station apparatus according to Embodiment 4, and a reception weight combining section 201 is provided instead of reception weight combining section 111.

To consider a predetermined sequence (here, for example, sequence 1), the installation position of branch 1 vertical polarization antenna element 401-1 with respect to mobile station apparatus 1 and the installation position of branch 2 horizontal polarization antenna element 402-1 with respect to mobile station apparatus 1 are virtually the same. As a result, a signal received by vertical polarization antenna element 401-1 and a signal received by horizontal polarization antenna element 402-1 virtually coincide as regards direction of arrival, and differ only in signal strength. The same also applies to sequence 2 and sequence 3.

Thus, in this embodiment, reception weight calculation is performed for only one of a plurality of branches, and the calculated reception weights are used as reception weights for all the above-mentioned plurality of branches. Following this, diversity combining that takes account of the effects of fading fluctuation is performed using the combined signal obtained by AAA processing in the above-mentioned plurality of branches. Thus, reception weight calculation is performed for only one branch rather than for all branches, enabling the amount of computation required for reception weight calculation to be reduced.

At the reception time for an information signal (containing a known signal) (that is, when the sequence 1 through sequence 3 received signals are signals corresponding to an information signal), in reception weight combining section 201, sequence 1 through sequence 3 received signals that have undergone reception processing are multiplied sequence-specific reception weights from a weight update section 107, respectively, and the sequence 1 through sequence 3 received signals multiplied by the sequence-specific reception weights are combined. By this means, a branch 2 combined signal is generated.

As described above, reception weight calculation is performed for only one of a plurality of branches, and the calculated reception weights are used as reception weights for all the above-mentioned plurality of branches. By this means, it is possible to reduce the amount of computation required for reception weight calculation compared with Embodiment 4.

(Embodiment 6)

Figure 6:
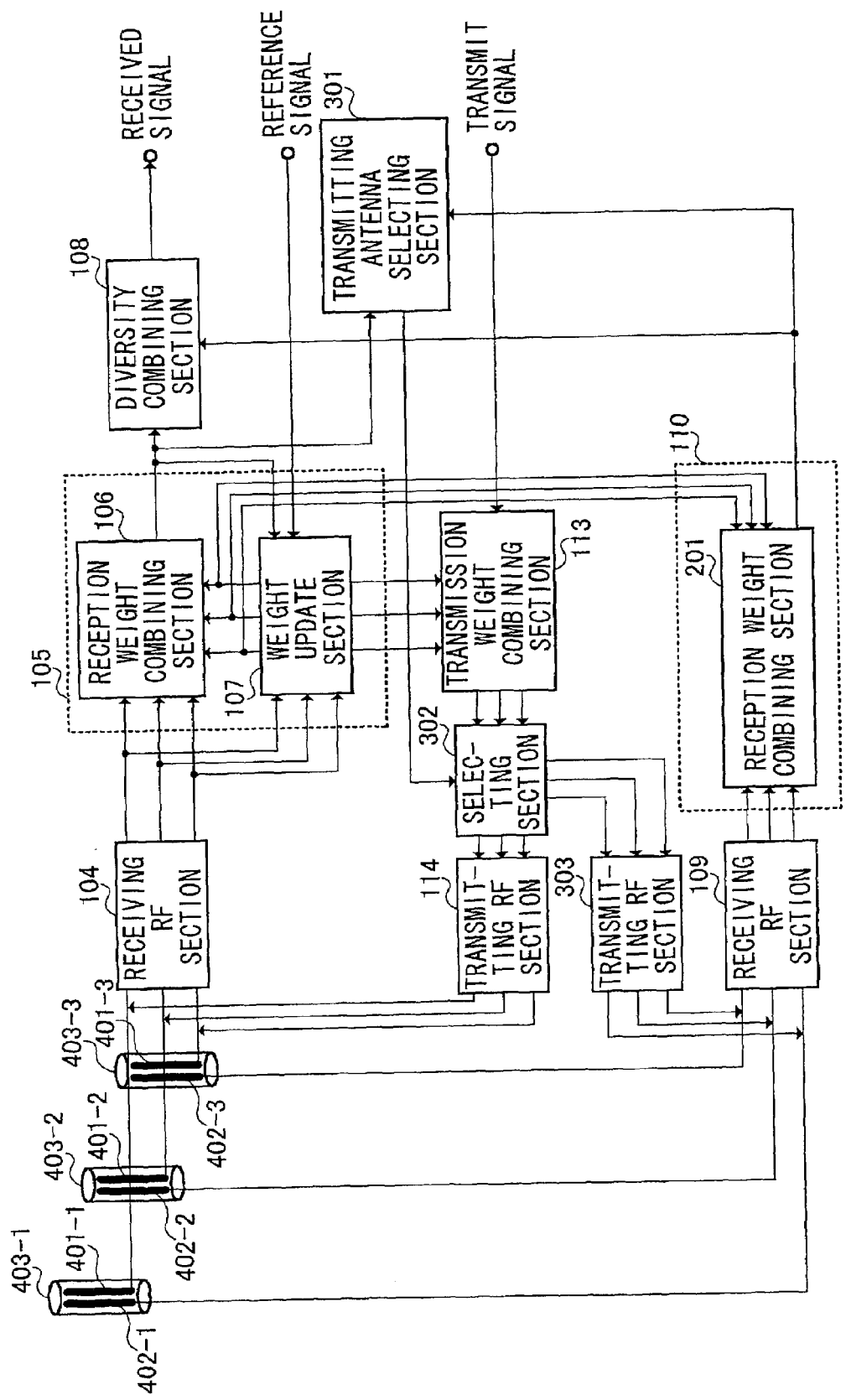
FIG. 6 is a block diagram showing the configuration of a base station apparatus according to Embodiment 6 of the present invention.

In this embodiment, a case is described, with reference to FIG. 6, in which diversity transmission is performed in Embodiment 5. FIG. 6 is a block diagram showing the configuration of a base station apparatus according to Embodiment 6 of the present invention. Parts in FIG. 6 identical to those in Embodiment 4 (FIG. 4) are assigned the same codes as in FIG. 4 and their detailed explanations are omitted.

In FIG. 6, a base station apparatus according to this embodiment has a configuration wherein a transmitting antenna selecting section 301, selecting section 302, and transmitting RF section 303 are provided in a base station apparatus according to Embodiment 5.

As described in Embodiment 5 above, to consider a predetermined sequence (here, for example, sequence 1) the installation position of branch 1 vertical polarization antenna element 401-1 with respect to mobile station apparatus 1 and the installation position of branch 2 horizontal polarization antenna element 402-1 with respect to mobile station apparatus 1 are virtually the same. As a result, a signal received by vertical polarization antenna element 401-1 and a signal received by horizontal polarization antenna element 402-1 virtually coincide as regards direction of arrival, and differ only in signal strength. The same also applies to sequence 2 and sequence 3.

Thus, in this embodiment, the transmitting antenna selecting section 301 measures the reception power of a branch 1 combined signal generated by a reception weight combining section 106 and the reception power of a branch 2 combined signal generated by a reception weight combining section 201, and selects the branch corresponding to the combined signal with the greater reception power as the branch to transmit a transmit signal. This transmitting antenna selecting section 301 outputs the selection result to the selecting section 302.

The selecting section 302 outputs sequence 1 through sequence 3 transmit signals from a transmission weight combining section 113 to a transmitting RF section 114 or transmitting RF section 303 in accordance with the selection result of the transmitting antenna selecting section 301. That is to say, when the vertical polarization antenna (horizontal polarization antenna) is selected by the transmitting antenna selecting section 301, the selecting section 302 outputs sequence 1 through sequence 3 transmit signals to transmitting RF section 114 (transmitting RF section 303).

In the directionalities of signals transmitted via sequence 1 antenna element 401-1 through sequence 3 antenna element 401-3 (when the vertical polarization antenna is selected) or sequence 1 antenna element 402-1 through sequence 3 antenna element 402-3 (when the horizontal polarization antenna is selected), a beam is present in the direction of arrival of mobile station apparatus 1 due to the fact that multiplication by transmission weights has been performed by the transmission weight combining section 113. As a result, reception power can be increased in mobile station apparatus 1, and interference imposed on mobile station apparatuses other than mobile station apparatus 1 can be suppressed. Therefore, communication quality can be maintained at a good level in mobile station apparatus 1 and other mobile station apparatuses.

Furthermore, by performing transmission to mobile station apparatus 1 via a branch selected based on the reception power of the combined signal of each branch (that is, diversity transmission), it is possible to compensate for a drop in reception power due to fading fluctuation in mobile station apparatus 1.

As described above, in this embodiment, reception weight calculation is performed for only one of a plurality of branches, and the calculated reception weights are used as reception weights and transmission weights for all the above-mentioned plurality of branches. By this means, it is possible to reduce the amount of computation required for transmission weight calculation, and also perform diversity transmission.

As described above, according to the present invention, it is possible to provide a base station apparatus that suppresses the effects of fading and interference and obtains a received signal with good characteristics while maintaining good communication quality in a mobile station apparatus.

This application is based on Japanese Patent Application No. 2000-389528 filed on Dec. 21, 2000, entire contents of which are expressly incorporated by reference herein.

INDUSTRIAL APPLICABILITY

The present invention relates to a base station apparatus used in a digital mobile communication system, and is particularly suitable for use in a base station apparatus provided with an adaptive array antenna.

The invention claimed is:

1. A base station apparatus comprising:

a first antenna element group comprising a plurality of vertical polarization antenna elements;

a second antenna element group comprising a plurality of horizontal polarization antenna elements;

a reception weight combining section that generates a first combined signal for said first antenna element group and a second combined signal for said second antenna element group, said first combined signal is generated by multiplying a signal received by each antenna element of said first group with a weight and combining the weighted signals of said first antenna element group, said second combined signal is generated by multiplying a signal received by each antenna element of said second group with a weight and combining the weighted signals of said second antenna element group;

a selection section that measures reception power of the first combined signal and the second combined signal and selects one of said first antenna element group and said second antenna element group based on the measured reception powers;

a transmission weight combining section that multiplies a transmit signal with a weight applied by said reception weight combining section to a signal received by an antenna element of said selected antenna element group; and a diversity transmission section that transmits the transmit signal from said selected antenna element group.

2. The base station apparatus according to claim 1, further comprising a diversity combining section that performs diversity combining of the first combined signal and the second combined signal.

3. The base station apparatus according to claim 1, wherein said reception weight combining section multiplies a signal received by an antenna from each of said first and second antenna element groups with a common weight.

* * * * *